(12) United States Patent
Kase et al.

(10) Patent No.: US 8,231,710 B2
(45) Date of Patent: *Jul. 31, 2012

(54) MEMBRANES AND PROCESSES FOR THEIR MANUFACTURE AND USE

(75) Inventors: Akira Kase, Holland (NL); Yujiro Itami, Holland (NL)

(73) Assignee: Fujifilm Manufacturing Europe B.V., Tilburg (NL)

( * ) Notice: Subject to any disclaimer, the term of this patent is extended or adjusted under 35 U.S.C. 154(b) by 325 days.

This patent is subject to a terminal disclaimer.

(21) Appl. No.: 12/601,039

(22) PCT Filed: May 26, 2008

(86) PCT No.: PCT/NL2008/050312
§ 371 (c)(1),
(2), (4) Date: Dec. 11, 2009

(87) PCT Pub. No.: WO2008/143516
PCT Pub. Date: Nov. 27, 2008

(65) Prior Publication Data
US 2010/0126352 A1 May 27, 2010

(30) Foreign Application Priority Data
May 24, 2007 (EP) .................... 07108818

(51) Int. Cl.
*B01D 53/22* (2006.01)
(52) U.S. Cl. ........ 95/45; 95/52; 96/4; 427/508; 427/595
(58) Field of Classification Search ............. 95/45, 52; 96/4; 427/508, 595
See application file for complete search history.

(56) References Cited

U.S. PATENT DOCUMENTS

| | | | |
|---|---|---|---|
| 3,074,834 A * | 1/1963 | Kine et al. ............ 442/128 |
| 4,963,165 A | 10/1990 | Blume et al. .......... 55/16 |
| 5,069,926 A | 12/1991 | Iwata et al. .......... 427/40 |
| 6,656,252 B2 * | 12/2003 | Kita et al. ............ 96/4 |
| 6,719,147 B2 | 4/2004 | Strano et al. ........ 210/490 |
| 2002/0071915 A1* | 6/2002 | Schubert et al. .... 427/385.5 |
| 2003/0110947 A1* | 6/2003 | Kita et al. ........... 96/4 |
| 2004/0213985 A1 | 10/2004 | Lee et al. ........... 428/315.7 |
| 2005/0235825 A1 | 10/2005 | Tin et al. ........... 95/45 |
| 2008/0017578 A1 | 1/2008 | Childs et al. ........ 210/650 |
| 2008/0070029 A1 | 3/2008 | Hessing et al. ...... 428/319.3 |
| 2008/0171156 A1 | 7/2008 | Olijve et al. ........ 428/32.26 |
| 2008/0171188 A1 | 7/2008 | Van Baak et al. .... 428/305.5 |
| 2008/0182044 A1 | 7/2008 | Itami et al. ......... 428/32.26 |
| 2008/0182914 A1 | 7/2008 | Itami et al. ......... 521/50.5 |
| 2008/0193735 A1 | 8/2008 | Hessing et al. ...... 428/304.4 |
| 2009/0202813 A1 | 8/2009 | Itami et al. ......... 428/319.3 |
| 2009/0208677 A1 | 8/2009 | Itami et al. ......... 428/32.14 |
| 2009/0208678 A1 | 8/2009 | van Baak et al. .... 428/32.18 |
| 2010/0132559 A1* | 6/2010 | Ishida et al. ........ 96/5 |
| 2010/0154641 A1* | 6/2010 | Kase et al. .......... 96/4 |
| 2010/0162892 A1* | 7/2010 | Kase et al. .......... 96/12 |
| 2010/0288122 A1* | 11/2010 | Liu et al. ........... 95/45 |

FOREIGN PATENT DOCUMENTS

| | | |
|---|---|---|
| JP | 07-060079 | 3/1995 |
| JP | 70-60079 | 3/1995 |
| JP | 08-024602 | 1/1996 |
| JP | 08-024603 | 1/1996 |
| JP | 80 24602 | 1/1996 |
| JP | 80 24603 | 1/1996 |
| WO | WO 2005/097304 | 10/2005 |
| WO | WO 2007/018425 | 2/2007 |
| WO | WO 2007/018427 | 2/2007 |

OTHER PUBLICATIONS

Patel et al., "Highly $CO_2$-Permeable and -Selective Membranes Derived from Crosslinked Poly(ethylene glycol) and Its Nanocomposites", Advanced Functional Materials, 14(7):699-707 (2004).
Lin et al., "High-Performance Polymer Membranes for Natural-Gas Sweetening", Advanced Materials, 18:39-44 (2006).
Sanchez et al., "Poly(ethylene oxide-*co*-epichlorohydrin) membranes for carbon dioxide separation", Journal of Membrane Science, 205:259-263 (2002).
Hirayama et al., "Permeation properties to $CO_2$ and $N_2$ of poly(ethylene oxide)-containing and crosslinked polymer films", Journal of Membrane Science, 160:87-99 (1999).
Zhou et al., "Preparation and properties of MPEG-grafted EAA membranes via thermally induced phase separation", Journal of Membrane Science, 267:90-98 (2005).
Lin et al., "Transport and structural characteristics of crosslinked poly(ethylene oxide) rubbers", Journal of Membrane Science, 276:145-161 (2006).
Lin et al., "Gas and Vapor Solubility in Cross-Linked Poly(ethylene Glycol Diacrylate)", Macromolecules, 38:8394-8407 (2005).
Lin et al., "The Effect of Cross-Linking on Gas Permeability in Cross-Linked Poly(Ethylene Glycol Diacrylate)", Macromolecules, 38:8381-8393 (2005).
Kalakkunnath et al., "Segmental Relaxation Characteristics of Cross-Linked Poly(ethylene oxide) Copolymer Networks", Macromolecules, 38:9679-9687 (2005).
Lin et al., "Gas Permeation and Diffusion in Cross-Linked Poly(ethylene glycol diacrylate)", Macromolecues, 39:3568-3580 (2006).

* cited by examiner

*Primary Examiner* — Jason M Greene
*Assistant Examiner* — Anthony Shumate
(74) *Attorney, Agent, or Firm* — Morgan, Lewis & Bockius LLP

(57) ABSTRACT

A process for preparing a membrane comprising the steps of providing a composition comprising a polymerizable compound having at least 25 oxyethylene groups and at least two non-substituted vinyl groups, applying the composition to a support thereby forming a continuous layer on the support, and polymerizing the composition thereby forming a non-porous polymer film. Also claimed are the resultant membranes and their uses, e.g. for separating polar and non-polar gases.

21 Claims, No Drawings

MEMBRANES AND PROCESSES FOR THEIR MANUFACTURE AND USE

This application is a 371 filing based on PCT/NL2008/050312 filed May 26, 2008 and claiming priority from European Application No. 07108818.1, filed May 24, 2007.

FIELD OF THE INVENTION

This invention relates to membranes and to processes for their preparation and use. The membranes are particularly useful for performing gas separation.

BACKGROUND OF THE INVENTION

For purifying gaseous mixtures e.g. natural gas and flue gas, separating undesired components from the main stream can in some cases be achieved based on the relative size of the components (size-sieving). Sometimes better results can be achieved by making use of the properties of the components to be separated. For example, U.S. Pat. No. 4,963,165 describes the separation of polar from non-polar components using membranes made from polyamide-polyether block copolymers which do not appear to be crosslinked. Polyethylene oxide (PEO) based membranes have been described as suitable for separating $CO_2$ from hydrogen and methane (Lin et al., Macromolecules, Vol. 38, no. 20, 2005, 8381-8407, 9679-9687; Journal of Membrane Science 276 (2006) 145-161; Macromolecules 39 (2006) 3568-3580; Advanced Materials 18 (2006) 39-44). JP8024602A and JP8024603A describe gas separation membranes which comprise polyalkylene glycol di(meth)acrylates. Hirayama et al, Journal of Membrane Science, 160, (1999), 87-99, describe polymer films made from polyethylene glycol mono- and di-methacrylates and their application for gas separation. JP7060079 describes plasma treated films having a hydrophilic surface comprising oxyethylene groups preferably having 2 to 30 repeating units. U.S. Pat. No. 5,069,926 describes porous ultrafiltration membranes suitable for the separation of oil and water which have been surface modified with plasma- or ozone-treated polyethylene glycol diacrylates. WO-A-2005/097304 describes membrane stacks comprising macroporous gel-filled membranes wherein polyethylene glycol diacrylates are used as cross-linkers which membrane is used for liquid separations.

There is a need for membranes having high permeability and selectivity for desired gases that are strong and flexible. Ideally such membranes can be produced efficiently at high speeds without requiring costly measures to guarantee safety. This invention aims at achieving these targets, at least in part.

SUMMARY OF THE INVENTION

According to a first aspect of the present invention there is provided a process for preparing a membrane comprising the steps of: (i) providing a composition comprising a polymerizable compound having at least 25 oxyethylene groups and at least two non-substituted vinyl groups; (ii) applying said composition to a support thereby forming a continuous layer on the support; (iii) polymerizing said composition thereby forming a non-porous polymer film.

For convenience the polymerizable compound comprising at least 25 oxyethylene groups and at least two vinyl groups is often abbreviated in this description and the claims to "the polymerizable compound".

In a second aspect, the present invention provides a membrane obtainable or obtained by a process of the first aspect of the present invention.

DETAILED DESCRIPTION

The membranes obtainable by the process of the present invention are particularly useful for purifying natural gas by removing polar gases (e.g. $CO_2$ and/or $H_2S$). Also for the purification of flue gases the membrane of the invention is suitable. Flue gas is typically gas that exits to the atmosphere via a flue, which is a pipe or channel for conveying exhaust gases from e.g. a fireplace, oven, furnace, boiler, combustion engine or steam generator. Particularly, it refers to the combustion exhaust gas produced at power plants. Its composition depends on what is being burned, but it will usually contain mostly nitrogen (typically more than two-thirds) derived from the combustion air, carbon dioxide ($CO_2$) and water vapor as well as excess oxygen (also derived from the combustion air). It further contains a small percentage of pollutants such as particulate matter, carbon monoxide, nitrogen oxides and sulfur oxides. Recently the separation and capture of $CO_2$ has become highly desirable for environmental reasons, for example to slow down global warming. Thus there is a demand for membranes having high permeability and a high selectivity at reasonable prices.

Preferably the membrane is a gas permeable membrane, especially a gas permeable membrane which has a high permeability to polar gases (e.g. $CO_2$, $H_2S$, $NH_3$, $SO_x$, nitrogen oxides) and a high selectivity for these polar gases over non-polar gases. The gases may comprise vapors, for example water vapor. In one embodiment the membrane is not permeable to liquids, e.g. water and aqueous solutions.

The membrane of the invention can be applied for a range of applications. The membrane can be used not only for gas/vapor separation but also for separation of larger molecules, as in the field of reverse osmosis and nanofiltration.

For separation of polar gases and vapors the membrane preferably has no pores or very small pores that do not allow non-polar gas molecules to pass. A suitable method to determine the pore size is observation by scanning electron microscope (SEM). Substantially non-porous means that no pores are detected by SEM (using a Jeol JSM-6335F Field Emission SEM, applying an accelerating voltage of 2 kV, working distance 4 mm, aperture 4, sample coated with Pt with a thickness of 1.5 nm, magnification 100 000×, 3° tilted view). Preferably the membrane has an average pore size of below 10 nm, more preferably below 7 nm, especially below 5 nm, e.g. below 2 nm. The maximum preferred pore size depends on the compounds to be separated. Another method to obtain an indication of the actual porosity is the permeance to liquids such as water. Preferably the permeance to liquids is very low, i.e. the average pore size of the membrane is such that the pure water permeance at 20° C. is less than $6 \cdot 10^{-8}$ $m^3/m^2 \cdot s \cdot kPa$, more preferably less than $3 \cdot 10^{-8}$ $m^3/m^2 \cdot s \cdot kPa$.

Preferably the polymerization is performed by a process comprising application of a composition comprising the polymerizable compound to a substrate, e.g. to form a thin layer thereon, and polymerizing the polymerizable compound to provide the membrane. In this way a membrane may be produced at low cost and at a high production rate (high application/coating speeds).

In one embodiment the substrate is a non-porous substrate. In this embodiment the resultant membrane typically is removed from the substrate after polymerization. In an alternative embodiment the substrate is porous and the resultant membrane and porous substrate remain in contact. The latter alternative can be very useful for proving membranes with greater mechanical strength and the process for making such supported membranes is particularly efficient and convenient.

Optionally the process further comprises the step of washing and/or drying the membrane after polymerization.

The polymerizable compound having at least 25 oxyethylene groups and at least two vinyl groups may be obtained from a number of commercial sources, for example Sigma Aldrich, Sartomer and Dajac Laboratories. Other compounds of this type may be prepared by processes published in the art. An oxyethylene group may be depicted as —($—CH_2—CH_2—O—$)—.

While not wishing to be limited by any particular theory, we believe the numerous oxyethylene groups interact with polar molecules, such as $CO_2$, very differently as compared with non-polar molecules such as $N_2$, which makes them very suitable for enhancing selectivity for polar over non-polar molecules.

Preferably the polymerizable compound has at least 30 oxyethylene groups, e.g. 31, 33 or more oxyethylene groups. A higher number of oxyethylene groups improves the permeability to polar gases. Surprisingly not only permeability and selectivity improve when a high number of oxyethylene groups are used, but also the physical strength of the resulting membrane is significantly better. Membranes made from polymerizable compounds having a low number of oxyethylene groups appear to be brittle and break easily when bended during handling. This is especially important when the membrane is used without substrate. But also attached to a porous substrate a flexible structure is desired to reduce the risk of cracking of the membrane.

Preferably the polymerizable compound has two (and only two) vinyl groups. The vinyl group is not substituted, i.e. a group of the formula $H_2C=CH—$. Substituted vinyl groups (such as methacrylates) are often less reactive than non-substituted vinyl groups due to steric hindrance, which will result in slower polymerization and the process taking longer and therefore being more expensive to perform. Furthermore membranes obtained from polymerizable compounds comprising substituted vinyl groups often have a lower oxyethylene content than membranes obtained from polymerizable compounds comprising non-substituted vinyl groups, often resulting in a lower permeability and possibly lower selectivity for polar gases over non-polar gases. In the case the polymerizable compound comprises substituted vinyl groups, a powerful polymerization method is preferred, for example a method comprising electron beam irradiation. Even when such powerful polymerization methods are used the vinyl groups are preferably unsubstituted vinyl groups.

Examples of suitable vinyl groups are acrylate groups, acrylamide groups, vinyl ether groups, vinyl ester groups, vinyl amide groups, allyl ether groups, allyl ester groups, allyl amine groups, allyl amide groups, styryl groups, and combinations thereof. The preferred vinyl groups are acrylic ($CH_2=CHC(O)—$), especially acrylate ($CH_2=CHC(O)O—$) groups. Compounds with acrylate groups are preferred because of their high reactivity in polymerization reactions, their price and widespread commercial availability.

The extent of crosslinking in the membrane is determined to a large extent by the number of ethylenically unsaturated groups in the polymerizable compound (more groups favoring more crosslinking) and the content of crosslinking agent, if any, copolymerized with the polymerizable compound. The locality of the ethylenically unsaturated groups relative to one another also has an impact. A relatively high content of compounds having di-, tri- or tetra-functionality will increase the rigidity of the resultant membrane. For a good performance a rigid structure is often not desired as this may restrict the membrane's permeability and flexibility. A less rigid membrane can be obtained by limiting the amount of polymerizable compound (which is multifunctional) in the composition and by including monofunctional monomers. A very low content (e.g. less than 3 weight %) of multifunctional polymerizable compound may in some cases result in a membrane which is not rigid enough for convenient use in the desired end application. Furthermore, this can also reduce the membrane's selectivity. Also the efficiency of the polymerization process may decrease when the composition has a very low content of the polymerizable compound, making a longer polymerization time necessary, which increases the membrane's cost of manufacture and potentially requires more strict polymerization conditions e.g. reaction under an inert atmosphere.

A more preferred method to achieve a low crosslink density is to increase the distance between the crosslinkable groups by using polymerizable compounds having a high molecular weight (MW). For difunctional polymerizable groups the crosslinkable (vinyl) groups are preferably located on the ends of the molecule. The molecular weight of the polymerizable compound is preferably at least 1200 Da, more preferably at least 1500 Da. Molecular weights as high as 20000, 40000 or even 60000 Da or more may be used. A practical higher limit is formed by the viscosity of the composition comprising the polymerizable compound which is preferably less than 4000 mPa·s at 35° C. Preferably the molecular weight of the polymerizable compound is lower than 100 000 Da.

The oxyethylene groups in the polymerizable compound may form an uninterrupted chain of such groups (e.g. as in —$(CH,CH_2O)_n$— wherein n is at least 25) or the chain may contain interruptions as for example —$(CH_2CH_2O)_{n-q}$—R—$(OCH_2CH_2)_q$— wherein n is at least 25 and q is 1 to n−1. Examples of such interruptions (R) include —$CH_2$—, —$(CH_2)_x$— wherein x>2, —$CH(CH_3)$—, —$C(CH_3)_2$—, —$CH_2—C(CH_3)_2—CH_2$—, —$C_6H_4$—, —$C_6H_4—C(CH_3)_2—C_6H_4$— (bisphenol A), —$(C=O)$—. Preferably, at least two vinyl groups are separated by at least 5, more preferably at least 15 or 25 oxyethylene groups.

The polymerizable compound has at least 25 oxyethylene groups because we have found this enhances permeance, permeability and selectivity, particularly for polar over non-polar gases (e.g. $CO_2$ over $N_2$). There is no particular limitation to the maximum number of oxyethylene group present in the compound, but crystallization of the poly-oxyethylene chain under the conditions the resultant membrane is applied should be prevented as much as possible, because in crystallized form the flux is severely reduced. Polymer films with matrices crystallizing at or below room temperature can be used without negative effects on the flux for high temperature applications, like purification of flue gas or water vapor, etc. A practical higher limit is formed by the viscosity of the composition comprising the polymerizable compound which is preferably less than 4000 mPa·s at 35° C. Bearing these factors in mind the number of oxyethylene groups in the polymerizable compound is preferably less than 2200, more preferably less than 500 or even less than 200, for example 80, 100 or 150 oxyethylene groups. For low temperature applications (e.g. room temperature or below, such as 30° C. or lower) the number of oxyethylene groups in the polymerizable compound is preferably less than 90, more preferably less than 45. Typical low temperature applications comprise natural gas separation processes, which are typically carried out at ambient temperatures, such as −20 to 40° C. Compounds in which the oxyethylene groups form an interrupted chain are often effective in preventing crystallization.

Preferably the polymerizable compound has a content of oxyethylene groups of at least 70 weight %, preferably at least 80 weight %, even more preferably at least 90 weight %. Preferably at most 99.85 weight % of the polymerizable compound is oxyethylene groups.

In the final membrane the polymerizable compound may have been copolymerized with other ingredients and therefore the overall oxyethylene content in the membrane may be lower than in the polymerizable compound. Preferably the membrane comprises a content of oxyethylene groups of at least 50 weight %, more preferably at least 60 weight %, most preferably at least 75 weight %. Preferred upper limit for the content of oxyethylene groups in the membrane is 98 weight % or 95 weight %.

Due to the presence of many oxyethylene groups in the membrane the polymerizable compounds used to form the membrane are often soluble in polar solvents such as water. For reasons of safety, health and the environment, as well as from economic viewpoint, this water solubility is particularly advantageous.

Preferably the composition comprises an aqueous solvent. Typically the solvent comprises water and optionally one or more organic solvents, especially water-miscible organic solvent(s). As examples of water-miscible organic solvents there may be mentioned: $C_{1-6}$-alkanols, preferably methanol, ethanol, n-propanol, isopropanol, n-butanol, sec-butanol, tert-butanol, n-pentanol, cyclopentanol and cyclohexanol; linear amides, preferably dimethylformamide or dimethylacetamide; ketones and ketone-alcohols, preferably acetone, methyl ether ketone, cyclohexanone and diacetone alcohol; water-miscible ethers, preferably tetrahydrofuran and dioxane; diols, preferably diols having from 2 to 12 carbon atoms, for example pentane-1,5-diol, ethylene glycol, propylene glycol, butylene glycol, pentylene glycol, hexylene glycol and thiodiglycol and oligo- and poly-alkyleneglycols, preferably diethylene glycol, triethylene glycol, polyethylene glycol and polypropylene glycol; triols, preferably glycerol and 1,2,6-hexanetriol; mono-$C_{1-4}$-alkyl ethers of diols, preferably mono-$C_{1-4}$-alkyl ethers of diols having 2 to 12 carbon atoms, especially 2-methoxyethanol, 2-(2-methoxyethoxy)ethanol, 2-(2-ethoxyethoxy)-ethanol, 2-[2-(2-methoxyethoxy)ethoxy]ethanol, 2-[2-(2-ethoxyethoxy)-ethoxy]-ethanol and ethyleneglycol monoallylether; cyclic amides, preferably 2-pyrrolidone, N-methyl-2-pyrrolidone, N-ethyl-2-pyrrolidone, caprolactam and 1,3-dimethylimidazolidone; cyclic esters, preferably caprolactone; sulphoxides, preferably dimethyl sulphoxide and sulpholane.

In case a solvent is used in the composition, the solvent is chosen so that a stable and homogeneous solution is formed which does not phase separate upon polymerization of the polymerizable compound.

The polymerization is preferably effected by irradiating the composition (which may be dry or not) by actinic radiation. Actinic radiation is electromagnetic radiation that can produce photochemical reactions. Suitable types of actinic radiation are infrared (IR) radiation, visible light and ultraviolet (UV) radiation. In principle irradiation with radiation of any suitable wavelength can be used, such as for example UV, visible or IR radiation, as long as it matches the absorption spectrum of the photo-initiator, if present in the composition, or as long as enough energy is provided to directly polymerize (or cure) the polymerizable compound without the need of a photo-initiator. The terms curing and polymerization are used interchangeably throughout this document.

Polymerization by thermal curing, e.g. using infrared radiation is also known. Thus polymerization may be effected by including a thermally reactive free radical initiator in the composition and heating the composition. Examples of thermally reactive free radical initiators include organic peroxides, e.g. ethyl peroxide and benzyl peroxide; hydroperoxides, e.g. methyl hydroperoxide; acyloins, e.g. such as benzoin; certain azo compounds, e.g. α,α'-azobisisobutyronitrile and γ,γ'-azobis(γ-cyanovaleric acid); persulfates; peracetates, e.g. methyl peracetate and tert-butyl peracetate; peroxalates, e.g. dimethyl peroxalate and di(tert-butyl) peroxalate; disulfides, e.g. dimethyl thiuram disulfide; and ketone peroxides, e.g. methyl ethyl ketone peroxide. Temperatures for thermal curing in the range of from about 30° C. to about 150° C. are generally employed. More often, temperatures in the range of from about 40° C. to about 110° C. are used.

Irradiation by ultraviolet light is preferred. Suitable wavelengths are for instance UV-A (400-320 nm), UV-B (320-280 nm), UV-C (280-200 nm), provided the wavelength matches with the absorbing wavelength of the photo-initiator, if present in the composition.

Suitable sources of ultraviolet light include mercury arc lamps, carbon arc lamps, low pressure mercury lamps, medium pressure mercury lamps, high pressure mercury lamps, swirlflow plasma arc lamps, xenon lamps, tungsten lamps, halogen lamps, lasers and ultraviolet light emitting diodes. Particularly preferred are ultraviolet light emitting lamps of the medium or high pressure mercury vapor type. In addition, additives such as metal halides may be present to modify the emission spectrum of the lamp. In most cases lamps with emission maxima between 200 and 450 nm are most suitable.

The energy output of the exposing device may be between 20 and 1000 W/cm, preferably between 40 and 500 W/cm but may be higher or lower as long as the desired exposure dose can be realized. The exposure intensity is one of the parameters that can be used to control the extent of polymerization which influences the final structure of the membrane. Preferably the exposure dose is at least 40 mJ/cm$^2$, more preferably between 40 and 600 mJ/cm$^2$, most preferably between 70 and 220 mJ/cm$^2$ as measured by an High Energy UV Radiometer (UV Power Puck™ from EIT—Instrument Markets) in the UV-B range indicated by the apparatus. Exposure times can be chosen freely but preferably are short and are typically less than 5 seconds, preferably less than 2 seconds, e.g. less than 1 second. For determining exposure time only the direct radiation including the radiation reflected by the mirror of the exposure unit is taken into account, not the indirect stray light.

Preferably the composition contains a photo-initiator, for example as one component of the liquid medium which may form part of the composition. Photo-initiators are usually required when the polymerizable compound is to be polymerized using UV or visible light radiation. Suitable photo-initiators are those known in the art such as radical type, cation type or anion type photo-initiators.

Examples of radical type I photo-initiators include α-hydroxyalkylketones, such as 2-hydroxy-1-[4-(2-hydroxyethoxy)phenyl]-2-methyl-1-propanone (Irgacure™ 2959: Ciba), 2-hydroxy-1-[4-(2-hydroxypropoxy)phenyl]-2-methyl-1-propanone (Omnirad™ 669: Ciba), 1-hydroxy-cyclohexyl-phenylketone (Irgacure™ 184: Ciba), 2-hydroxy-2-methyl-1-phenyl-1-propanone (Sarcure™ SR1173: Sartomer, or Additol™ HDMAP: Surface Specialities), oligo [2-hydroxy-2-methyl-1-{4-(1-methylvinyl)phenyl}propanone] (Sarcure™ SR1130: Sartomer), 2-hydroxy-2-methyl-1-(4-tert-butyl-)phenylpropan-1-one, 2-hydroxy-[4'-(2-hydroxypropoxy)phenyl]-2-methylpropan-1-one, 1-(4-Isopropylphenyl)-2-hydroxy-2-methyl-propanone (Darcure™ 1116: Ciba); α-aminoalkylphenones such as 2-benzyl-2-(dimethylamino)-4'-morpholinobutyrophenone (Irgacure™ 369: Ciba), 2-methyl-4'-(methylthio)-2-morpholinopropiophenone (Irgacure™ 907: Ciba); α,α-dialkoxyacetophenones such as α,α-dimethoxy-α-phenylacetophenone (Irgacure™ 651: Ciba), 2,2-diethyoxy-1,2-diphenylethanone (Uvatone™ 8302: Upjohn), α,α-diethoxyacetophenone (DEAP: Rahn), α,α-di-(n-butoxy)acetophenone (Uvatone™ 8301: Upjohn); phenylglyoxolates such as methylbenzoylformate (Darocure™ MBF: Ciba); benzoin derivatives such as benzoin (Esacure™ BO: Lamberti), benzoin alkyl ethers (ethyl, isopropyl, n-butyl, isobutyl, etc.), benzylbenzoin benzyl ethers, Anisoin; mono- and bis-Acylphosphine oxides, such as 2,4,6-trimethylbenzoyl-diphenylphosphine oxide (Lucirin™ TPO: BASF), ethyl-2,4,6-trimethylbenzoylphenylphosphinate (Lucirin™ TPO-L: BASF), bis(2,4,6-trimethylbenzoyl)-phenylphosphine oxide (Irgacure™ 819: Ciba), bis(2,6-dimethoxybenzoyl)-2,4,4-trimethyl-pentylphosphineoxide (Irgacure™ 1800 or 1870). Other commercially available photo-initiators are 1-[4-(phenylthio)-2-(O-benzoyloxime)]-1,2-octanedione (Irgacure™ OXE01), 1-[9-ethyl-6-(2-methylbenzoyl)-9H-carbazol-3-yl]-1-(O-acetyloxime)ethanone (Irgacure™ OXE02), 2-hydroxy-1-{4-[4-(2-hydroxy-2-methyl-propionyl)-benzyl]-phenyl}-2-methyl-propan-1-one (Irgacure™ 127), oxy-phenyl-acetic acid 2-[2 oxo-2-phenyl-acetoxy-ethoxy]-ethyl ester (Irgacure™ 754), oxy-phenyl-acetic-2-[2-hydroxy-ethoxy]-ethyl ester (Irgacure™ 754), 2-(dimethylamino)-2-(4-methylbenzyl)-1-[4-(4-morpholinyl)phenyl]-1-butanone (Irgacure™ 379), 1-[4-[4-benzoylphenyl)thio]phenyl]-2-methyl-2-[(4-methylphenyl)sulfonyl)]-1-propanone (Esacure™ 1001M from Lamberti), 2,2'-bis(2-chlorophenyl)-4,4',5,5'-tetraphenyl-1,2'-bisimidazole (Omnirad™ BCIM from WM), and combinations thereof.

Examples of type II photo-initiators include benzophenone derivatives such as benzophenone (Additol™ BP: UCB), 4-hydroxybenzophenone, 3-hydroxybenzophenone, 4,4'-dihydroxybenzophenone, 2,4,6-trimethylbenzophenone, 2-methylbenzophenone, 3-methylbenzophenone, 4-methylbenzophenone, 2,5-dimethylbenzophenone, 3,4-dimethylbenzophenone, 4-(dimethylamino)benzophenone, [4-(4-methylphenylthio)phenyl]phenylmethanone, 3,3'-dimethyl-4-methoxy benzophenone, methyl-2-benzoylbenzoate, 4-phenylbenzophenone, 4,4-bis(dimethylamino)benzophenone, 4,4-bis(diethylamino)benzophenone, 4,4-bis(ethylmethylamino)benzophenone, 4-benzoyl-N,N,N-trimethylbenzenemethanaminium chloride, 2-hydroxy-3-(4-benzoylphenoxy)-N,N,N-trimethyl-1-propanamium chloride, 4-(13-Acryloyl-1,4,7,10,13-pentaoxamidecyl)benzophenone (Uvecryl™ P36: UCB), 4-benzoyl-N,N-dimethyl-N-[2-(1-oxo-2-propenyl)oy]ethylbenzenemethanaminium chloride, 4-benzoyl-4'-methyldiphenyl sulphide, anthraquinone, ethylanthraquinone, anthraquinone-2-sulfonic acid sodium salt, dibenzosuberenone; acetophenone derivatives such as acetophenone, 4'-phenoxyacetophenone, 4'-hydroxyacetophenone, 3'-hydroxyacetophenone, 3'-ethoxyacetophenone; thioxanthenone derivatives such as thioxanthenone, 2-chlorothioxanthenone, 4-chlorothioxanthenone, 2-isopropylthioxanthenone, 4-isopropylthioxanthenone, 2,4-dimethylthioxanthenone, 2,4-diethylthioxanthenone, 2-hydroxy-3-(3,4-dimethyl-9-oxo-9H-thioxanthon-2-yloxy)-N,N,N-trimethyl-1-propanaminium chloride (Kayacure™ QTX: Nippon Kayaku); diones such as benzyl, camphorquinone, 4,4'-dimethylbenzyl, phenanthrenequinone, phenylpropanedione; dimethylanilines such as 4,4',4"-methylidyne-tris(N,N-dimethylaniline) (Omnirad™ LCV from IGM); imidazole derivatives such as 2,2'-bis(2-chlorophenyl)-4,4',5,5'-tetraphenyl-1,2'-bisimidazole; titanocenes such as bis(eta-5-2,4-cyclopentadiene-1-yl)-bis-[2,6-difluoro-3-1H-pyrrol-1-yl]phenyl]titanium (Irgacure™ 784: Ciba); iodonium salt such as iodonium, (4-methylphenyl)-[4-(2-methylpropyl-phenyl)-hexafluorophosphate (1-), and combinations thereof. If desired combinations of different types of photo-initiators may also be used.

For acrylates, diacrylates, triacrylates or multifunctional acrylates, type I photo-initiators are preferred. Especially alpha-hydroxyalkylphenones, such as 2-hydroxy-2-methyl-1-phenyl propan-1-one, 2-hydroxy-2-methyl-1-(4-tert-butyl-) phenylpropan-1-one, 2-hydroxy-[4'-(2-hydroxypropoxy)phenyl]-2-methylpropan-1-one, 2-hydroxy-1-[4-(2-hydroxyethoxy)phenyl]-2-methyl propan-1-one, 1-hydroxycyclohexylphenylketone and oligo[2-hydroxy-2-methyl-1-{4-(1-methylvinyl)phenyl}propanone], alpha-aminoalkylphenones, alpha-sulfonylalkylphenones and acylphosphine oxides such as 2,4,6-trimethylbenzoyl-diphenylphosphine oxide, ethyl-2,4,6-trimethylbenzoyl-phenylphosphinate and bis(2,4,6-trimethylbenzoyl)-phenylphosphine oxide, are preferred. Preferably the ratio of photo-initiator and polymerizable compound(s) is between 0.001 and 0.1, more preferably between 0.005 and 0.05, based on weight. It is preferred to minimize the amount of photo-initiator used, in other words preferably all photo-initiator has reacted after the curing step (or curing steps). Remaining photo-initiator may have adverse effects on the membrane and excessive washing may be required to wash out remaining photo-initiator. A single type of photo-initiator may be used but also a combination of several different types.

When UV radiation is used to polymerize the polymerizable compound a UV light source can be selected having emissions at several wavelengths. The combination of UV light source and photo-initiator(s) can be optimized so that sufficient radiation penetrates deep into the layer(s) to activate the photo-initiators. A typical example is an H-bulb with an output of 600 Watts/inch (240 W/cm) as supplied by Fusion UV Systems which has emission maxima around 220 nm, 255 nm, 300 nm, 310 nm, 365 nm, 405 nm, 435 nm, 550 nm and 580 nm. Alternatives are the V-bulb and the D-bulb which have a different emission spectrum, with main emissions between 350 and 450 nm and above 400 nm respectively. From a choice of light sources and photo-initiators optimal combinations can be made. Applying multiple types of photo-initiator allows for thicker layers to be cured efficiently with the same intensity of irradiation.

When the composition is free from photo-initiators, the polymerizable compound can be advantageously polymerized using electron-beam exposure, using analogous procedures to those known in the art. Preferably the electron-beam exposure uses a lamp having an output of 50 to 300 keV. Polymerization can also be achieved by plasma or corona exposure.

Polymerization rates may be increased by including amine synergists in the polymerizable composition. Amine synergists enhance reactivity and retard oxygen inhibition. Suitable amine synergists include free alkyl amines, e.g. triethylamine, methyldiethanol amine, triethanol amine; aromatic amine, e.g. 2-ethylhexyl-4-dimethylaminobenzoate, ethyl-4-dimethylaminobenzoate and also polymeric amines, e.g. polyallylamine and its derivatives. Polymerizable amine synergists such as ethylenically unsaturated amines (e.g. (meth)acrylated amines) are preferred because their use gives less odor due to its ability to be copolymerized into the membrane. If added, the amount of amine synergist included in the composition is preferably 0.1 to 10 wt. %, more preferably from 0.3-3 wt. %, based on the total weight of the polymerizable compounds.

Where desired, a surfactant or combination of surfactants may be included in the composition as a wetting agent or to adjust surface tension. Commercially available surfactants may be utilized, including copolymerizable surfactants. Surfactants suitable for use in the polymerizable composition include nonionic surfactants, ionic surfactants, amphoteric surfactants and combinations thereof. Preferred nonionic surfactants include ethoxylated alkylphenols, ethoxylated fatty alcohols, ethylene oxide/propylene oxide block copolymers, fluoroalkyl ethers, and the like. Preferred ionic surfactants include, but are not limited to, the following: alkyltrimethylammonium salts wherein the alkyl group typically contains from 8 to 22 (preferably 12 to 18) carbon atoms; alkylbenzyldimethylammonium salts wherein the alkyl group typically contains from 8 to 22 (preferably 12 to 18) carbon atoms, and ethylsulfate; and alkylpyridinium salts wherein the alkyl group typically contains from 8 to 22 (preferably 12 to 18) carbon atoms. Surfactants may be for instance fluorine based or silicon based. Examples of suitable fluorosurfactants are: fluoro $C_2$-$C_{20}$ alkylcarboxylic acids and salts thereof, disodium N-perfluorooctanesulfonyl glutamate, sodium 3-(fluoro-$C_6$-$C_{11}$ alkyloxy)-1-$C_3$-$C_4$ alkyl sulfonates, sodium 3-(omega-fluoro-$C_6$-$C_8$ alkanoyl-N-ethylamino)-1-propane sulfonates, N-[3-(perfluorooctanesulfonamide)-propyl]-N,N-dimethyl-N-carboxymethylene ammonium betaine, perfluoro alkyl carboxylic acids (e.g. $C_7$-$C_{13}$-alkyl carboxylic acids) and salts thereof, perfluorooctane sulfonic acid diethanolamide, Li, K and Na perfluoro $C_4$-$C_{12}$ alkyl sulfonates, Li, K and Na N-perfluoro $C_4$-$C_{13}$ alkane sulfonyl-N-alkyl glycine, fluorosurfactants commercially available under the name Zonyl® (produced by E.I. Du Pont) that have the chemical structure of $RfCH_2CH_2SCH_2CH_2CO_2Li$ or $RfCH_2CH_2$—O—$(CH_2CH_2O)_x$H wherein Rf=F$(CF_2CF_2)_{3-8}$ and x=0 to 25, N-propyl-N-(2-hydroxyethyl)perfluorooctane sulfonamide, 2-sulfo-1,4-bis(fluoroalkyl)butanedioate, 1,4-bis(fluoroalkyl)-2-[2-N,N,N-trialkylammonium)alkyl amino]butanedioate, perfluoro $C_6$-$C_{10}$ alkylsulfonamide propyl sulfonyl glycinates, bis-(N-perfluorooctylsulfonyl-N-ethanolaminoethyl)phosphonate, mono-perfluoro $C_6$-$C_{16}$ alkyl-ethyl phosphonates, and perfluoroalkylbetaine. Also useful are the fluorocarbon surfactants described e.g. in U.S. Pat. No. 4,781,985 and in U.S. Pat. No. 5,084,340.

Silicon based surfactants are preferably polysiloxanes such as polysiloxane-polyoxyalkylene copolymers. Such copolymers may be for example dimethylsiloxane-methyl (polyoxyethylene) copolymer, dimethylsiloxane-methyl (polyoxyethylene-polyoxypropylene) siloxane copolymer, trisiloxane alkoxylate as a copolymer of trisiloxane and polyether, and siloxane propoxylate as a copolymer of siloxane and polypropylene oxide. The siloxane copolymer surfactants may be prepared by any method known to those having skill in the art and can be prepared as random, alternate, block, or graft copolymers. The polyether siloxane copolymer preferably has a weight-average molecular weight in a range of 100 to 10,000. Examples of polyether siloxane copolymers commercially available in the market include SILWET DA series, such as SILWET 408, 560 or 806, SILWET L series such as SILWET-7602 or COATSIL series such as COATSIL 1211, manufactured by CK WITCO; KF351A, KF353A, KF354A, KF618, KF945A, KF352A, KF615A, KF6008, KF6001, KF6013, KF6015, KF6016, KF6017, manufactured by SHIN-ETSU; BYK-019, BYK-300, BYK-301, BYK-302, BYK-306, BYK-307, BYK-310, BYK-315, BYK-320, BYK-325, BYK-330, BYK-333, BYK-331, BYK-335, BYK-341, BYK-344, BYK-345, BYK-346, BYK-348, manufactured by BYK-CHEMIE; and GLIDE series such as GLIDE 450, FLOW series such as FLOW 425, WET series such as WET 265, manufactured by TEGO®.

Preferably the membrane has low or no solubility in any gases they are used to separate. The membrane solubility may be reduced by including a crosslinking agent in the composition. Suitable crosslinking agents are generally small molecules (e.g. molecular weight below 1500 Da, preferably below 1000 Da) having at least two, preferably at least three, ethylenically unsaturated groups.

Preferably the dry thickness of the membrane as free film is 20 μm to 300 μm, more preferably 30 to 200 μm. A very thin free film generally has not enough strength for most applications. Preferably the membrane of the invention is joined to a substrate. The substrate optionally strengthens the membrane and the optimal thickness of the combined membrane and substrate is based on properties such as permeability and uniformity and the desired strength to be achieved. When the substrate gives the strength to the combination the dry thickness of the membrane layer is typically 0.03 to 10 μm, more preferably 0.05 to 2 μm. The permeance to gases and vapors is directly related to the thickness of the membrane, so a membrane thickness as thin as possible is preferred. On the other hand the membrane is preferably uniform in thickness and without defects such as pinholes that would deteriorate the selectivity.

The permeability to gases is influenced by the swellability of the membrane and by plastization. By plastization compounds penetrate the membrane and act as plasticizer. In humid environments water (vapor) may cause the swelling but also impurities in the gas flow such as hydrocarbon compounds, alcohols, etc. may contribute. Too much swelling/plastization may reduce the selectivity for polar gases over non-polar gases and may damage the membrane. The degree of swelling/plastization can be controlled by the types and ratio of compounds being polymerized, the extent of crosslinking if any (exposure dose, photo-initiator type and amount) and by other ingredients (e.g. chain transfer agents, synergists).

In one embodiment the process for preparing a membrane comprises the polymerization of at least one further polymerizable composition in addition to the process as defined in the first aspect of the present invention. Optionally the further composition comprises a polymerizable compound having at least 25 oxyethylene groups and at least two ethylenically unsaturated groups. Thus the further composition may or may not be of the type defined for use in the first aspect of the present invention, and when it is different an asymmetric membrane may result.

Conveniently this aspect of the invention may be performed on a substrate. For example, after the polymerization step a membrane results which comprises at least a top layer and a bottom layer that is closer to the substrate than the top layer. In this embodiment the top layer preferably comprises the membrane obtained by polymerizing a polymerizable compound having at least 25 oxyethylene groups and at least two vinyl groups and the bottom layer has a porous structure and gives strength to the top layer. For a two-layer membrane structure the bottom layer preferably has a dry thickness of between 50 and 400 μm, preferably between 70 and 300 μm, most preferably between 100 and 250 μm and the to player preferably has a dry thickness smaller than 10 preferably between 0.03 and 4 μm, most preferably between 0.05 and 2 μm.

Optionally the composition containing the polymerizable compound further comprises one or more thiol compounds. These thiol compounds act as chain transfer agents which are known to be less sensitive to oxygen inhibition and whose usage result in a more uniform polymer layer. Examples of thiol compounds include mercaptoacetic acid, mercaptopropionic acid, alkyl mercaptopropionate, mercapto-propylsulfonate, ethyldithiocarbonato-S-sulfopropylester, dimercaptopropane sulfonate and mercaptobenzimidazole sulfonate. Preferred thiol compounds are mercaptoethanol, mercaptoethylether, mercaptobenzimidazole, ethyldithioacetate, butanethiol, and ethylenedioxydiethanethiol.

Optimum quantities depend very much on the composition of the crosslinkable composition, on the type of the chain transfer agent (reactivity) and on the irradiation dose so the optimum concentration has to be determined case by case. At high levels of chain transfer agents it was found that adhesion problems may occur if the compound is in the layer adjacent to a substrate. When a multilayer membrane is made the chain transfer agent is preferably in the toplayer where the effect on surface structure is expected to be the highest. Very high levels may retard any crosslinking reaction too much resulting in a layer that is not completely polymerized and is still wet. Preferably the chain transfer agent is present in an amount between 0.001 and 1.0 mmol/g polymerizable compound. For most compounds the preferred range of chain transfer agent will be between 0.005 and 0.1 mmol/g polymerizable compound. If the membrane consists of more than one layer the mentioned range apply to the layer or layers comprising the chain transfer agent.

If desired copolymerizable anionic, cationic and/or zwitterionic components may be included in the composition in order to modify the end properties of the membrane.

Additives which may be included in the composition include one or more plasticizers, such as (poly)alkylene glycol, glycerol ethers and polymer lattices with low Tg-value (glass transition temperature) and one or more conventional additives, such as acids, pH controllers, preservatives, viscosity modifiers c.q. stabilisers, dispersing agents, inhibitors, antifoam agents, organic/inorganic salts, anionic, cationic, non-ionic and/or amphoteric surfactants and the like in accordance with the objects to be achieved.

The above-mentioned additives (photo-initiators, amine synergists, surfactants, chain transfer agents, plasticizers, conventional additives) may be selected from those known to a person skilled in the art and may be included in the composition in a range of preferably from 0 to 20 weight % based on the composition to be polymerized. Any of the components mentioned above may be employed alone or in combination with each other. They may be added after being solubilized in water, dispersed, polymer-dispersed, emulsified or converted into oil droplets.

The composition optionally comprises one of the polymerizable compounds or it may contain more than one of the polymerizable compounds, optionally other compounds that may copolymerize therewith. These other compounds include higher oxyalkylenes, e.g. oxypropylenes and oxybutylenes, and may be present in the composition, although low amounts of such copolymerizable higher oxyalkylenes are preferred (e.g 0 to 10 weight %) because of their less hydrophilic character and their higher price and more limited commercial availability.

In general, the preferred composition comprises copolymerization of the polymerizable compound with one or more other ethylenically unsaturated compounds. For instance, copolymerization of the polymerizable compound with monofunctional monomers (i.e. compounds having 1 ethylenically unsaturated group) can give good results, a higher permeability can be obtained. These ethylenically unsaturated compounds may comprise an unsubstituted vinyl group but may also comprise a substituted vinyl group such as a methacrylic group, a maleic group, a fumaric group, a glutaconic group, an itaconic group, a citraconic group, a mesaconic group, a tiglic group, an angelic group or a senecioic group. Preferably these other ethylenically unsaturated compounds also comprise a high number of oxyethylene groups, e.g. at least 25 oxyethylene groups. Alternatively or additionally higher functional monomers may be used but usually in low amounts to prevent a too high crosslink density.

The composition used in the process according to the first aspect of the present invention preferably comprises the following components:

(i) 3 to 80 weight % in total of said polymerizable compound;

(ii) 0 to 75 weight % in total of compounds having one (and only one) ethylenically unsaturated group;

(iii) 0 to 10 weight % in total of other additives;

wherein the balance to 100 weight % is a liquid medium.

Typically the composition comprises 3 to 80 weight %, more preferably 5 to 60 weight % in total of the components (i) to (iii) specified above and the balance to 100 weight % is a liquid medium. The liquid medium typically comprises water, one or more organic solvents, surfactants and/or photoinitiators, etc.

Suitable compounds falling within category (i) but not category (ii) or (iii) can be described according the following general formulae:

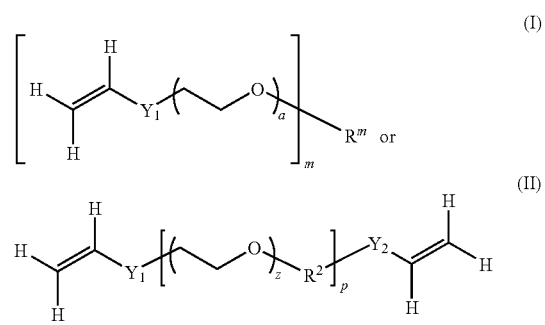

wherein a is at least 25/m and less than 1100;

z is at least 25/p and less than 1100;

m is 2-6;

p is at least 1 and less than 500;

$R^m$ is a polyvalent radical corresponding to m: $R^2$ (m=2), $R^3$ (m=3), $R^4$ (m=4), $R^5$ (m=5), $R^6$ (m=6).

$R^2$ is $R^{21}$ or $R^{22}$, where $R^{21}$ is for example alkylene group —$(CH_2)_x$—, —$C(CH_3)_2$—, —$CH_2$—$C(CH_3)_2$—$CH_2$—, —$C_6HR^1_3$—, —$C_6H_2R^1_2$—, —$C_6H_3R^1$—, —$C_6R^1_4$—, —$C_6H_4$—$CH_2$—$C_6H_4$—, —$C_6H_4$—$CH(CH_3)$—$C_6H_4$—, —$C_6H_4$—$C(CH_3)_2$—$C_6H_4$—, or polyalkylene glycol (e.g. poly(propylene glycol), poly(butylene glycol), poly(trimethylene glycol), poly(tetramethylene glycol)).

$R^{22}$ is for example carbonyl group (—CO)= or dicarboxylic group of formula: —C(=O)—$R^{21}$—C(=O)—, dicarbamate group of formula: —C(=O)—NH—$R^{21}$—NH—C(=O)—, or dicarbonate group of formula: —C(=O)—O—$R^{21}$—O—C(=O)—.

wherein x is 1-10 and $R^1$ is H, or an alkyl group of $C_1$-$C_{10}$, or an aromatic group, or an alkoxy group, or an ester group.

Examples of R³:

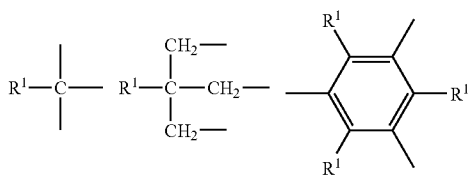

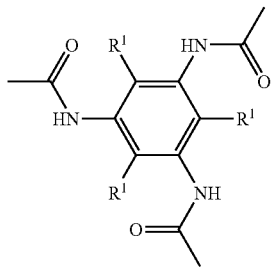

Examples of R⁴:

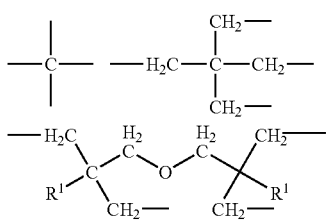

Example of R⁶:

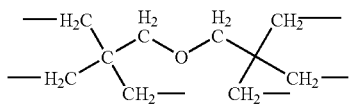

$Y_1$— and $Y_2$— are for example —(C=O)—O—, —C(=O)—O—(CH$_2$)$_x$—O—, —C(=O)—NR$^1$—, —C(=O)—NR$^1$—(CH$_2$)$_x$—O—, —C(=O)—OCH$_2$—CH(OH)—CH$_2$O—, —C(=O)—OCH$_2$—CH(OH)—CH$_2$NR$^1$—, —CH=CH—O—, —O—C(=O)—(CH$_2$)$_x$—O—, —S—, —NR$^1$—, —NH—C(=O)—(CH$_2$)$_x$—O—, —CH$_2$—O—, —CH$_2$—O—C(=O)—(CH$_2$)$_x$—O—, —CH$_2$—NH—C(=O)—(CH$_2$)$_x$—O—, —SiR$^1$$_3$—, —CH$_2$—SiR$^1$$_3$—.

wherein x is 1-10 and R$^1$ is H, or an alkyl group of $C_1$-$C_{10}$, or an aromatic group, or an alkoxy group, or an ester group.

Total number of oxyethylene groups in the molecule n=z*m or n=z*p.

Examples of specific compounds falling within category (i) but not category (ii) or (iii) include: Poly(ethylene glycol) diacrylate, Poly(ethylene glycol) divinyl ether, Poly(ethylene glycol) diallyl ether, Bisphenol A ethoxylate diacrylate, neopentylglycol ethoxylate diacrylate, propanediol ethoxylate diacrylate, butanediol ethoxylate diacrylate, hexanediol ethoxylate diacrylate, poly(ethylene glycol-co-propylene glycol) diacrylate, Poly(ethylene glycol)-block-poly(propylene glycol)-block-poly(ethylene glycol) diacrylate, Glycerol ethoxylate triacrylate, trimethylolpropane ethoxylate triacrylate, trimethylolpropane ethoxylate triacrylate, pentaerythrytol ethoxylate tetraacrylate, ditrimethylolpropane ethoxylate tetraacrylate, dipentaerythrytol ethoxylate hexaacrylate.

Examples of compounds having one (and only one) ethylenically unsaturated groups which fall within category (ii) but not (i) or (iii) include alkyl (meth)acrylates, (meth)acrylic acid, (meth)acrylamide, (meth)acrylonitrile, vinyl pyridine, vinyl pyrrolidone, vinylacetate, and poly(ethylene glycol) (meth)acrylates of the following structure, wherein w is 1-100 and R$^{11}$ is H or an alkyl group of $C_1$-$C_{10}$ or an aromatic group or an alkoxy group or an ester group and R$^{12}$ is H, or a methyl group.

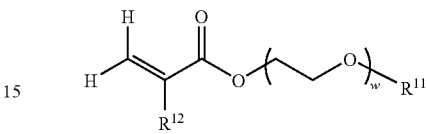

In one embodiment the process according to the first aspect of the present invention comprises a process for preparing a membrane according the following steps:
(i) applying a composition comprising a compound comprising at least 25 oxyethylene groups and at least two vinyl groups to a substrate;
(ii) polymerizing the compound by exposing to actinic radiation or to electron beam radiation thereby forming a polymer film; and
(iii) optionally washing and/or drying the polymer film.

Preferably the composition is the preferred composition referred to earlier in this specification (i.e. the composition having components (i) to (iii).)

The membrane obtained by the process of the present invention is preferably suitable for use as a gas separation membrane. In one embodiment the membrane further comprises a substrate. The substrate is porous and preferably the average pore size of the substrate is greater than the average pore size of the membrane. In this embodiment the membrane does not need to be removed from the substrate and may be used 'as is', complete with substrate, or if desired one may remove the membrane from the substrate.

When high intensity UV light is used to effect polymerization the heat is often generated by the UV lamp(s). Cooling air may be applied to prevent the lamps from becoming overheated. Still a significant dose of IR light is irradiated together with the UV-beam. In one embodiment the polymerization is effected using one or more ultra violet lamps irradiating the composition through an infra red absorbing material which absorbs heat from the lamp, for example an infra red absorbing or reflecting quartz plate.

The composition may be laid down on a support e.g. a substrate using known film forming methods. For example, one may apply the composition to a support using curtain coating, extrusion coating, air-knife coating, slide coating, roll coating method, reverse roll coating, dip coating, rod bar coating and spray coating. The coating of multiple layers can be done simultaneously or consecutively, depending on the embodiments used. In order to produce a sufficiently flowable composition for use in a high speed coating machine, it is preferred that the viscosity of the composition does not exceed 4000 mPa·s at 35° C., more preferably that it should not exceed 1000 mPa·s at 35° C. For coating methods such as slide bead coating the preferred viscosity is from 1 to 100 mPa·s. The desired viscosity is preferably achieved by controlling the amount of solvent, preferably water.

With suitable coating techniques coating speeds of at least 15 m/min, e.g. more than 20 m/min or even higher, such as 60 m/min, 120 m/min or more, up to 400 m/min, can be reached.

To reach the desired dose at high coating speeds more than one UV lamp may be required, so that the coated layer is irradiated by more than one lamp. When two or more lamps are used the lamps may give an equal dose or each lamp may have an individual setting. For instance the first lamp may give a higher dose than the second and following lamps or the exposure intensity of the first lamp may be lower. In a preferred process the membrane is produced at a rate of at least 30 m/min, more preferably over 50 m/min.

Before applying the composition to the surface of a support for polymerization the support may be subjected to a corona discharge treatment, glow discharge treatment, flame treatment, ultraviolet light irradiation treatment and the like, for the purpose of improving the wettability and the adhesiveness.

Whereas it is possible to practice the invention on a batch basis with the composition being applied to a stationary support surface, to gain full advantage of the invention, it is much preferred to practice it on a continuous basis by applying the composition to a moving support such as a roll-driven continuous web or belt. Using such apparatus the polymerizable composition can be laid down and the membrane formed on a continuous basis. Another option is to form a membrane using a large batch basis, for example the composition is poured or otherwise applied continuously onto the upstream end of a continuously driven belt support, the irradiation source being located above the belt downstream of a composition application station and the membrane removal station—if applicable—being further downstream of the belt, the membrane being removed in the form of a continuous sheet thereof. Removal of any water or organic solvent from the membrane can be accomplished either before or after the membrane is taken from the belt. For this embodiment and all others where it is desired to remove the membrane from the support surface, it is, of course, preferable that the support be such as to facilitate as much as possible the removal of the membrane therefrom. Typical of the support surfaces useful for the practice of such embodiments are supports having a low surface energy, e.g. smooth, stainless steel sheet or, better yet, teflon or teflon-coated metal sheet. Rather than using a continuous belt, the support surface can be of an expendable material, such as release paper, resin coated paper, plastic film, or the like (but not soluble in the solvent when present), in the form of a roll thereof such that it can be continuously unrolled from the roll, upstream of the composition application station, as a continuous driven length and then rerolled, with the membrane thereon, downstream of the radiation station. In another embodiment the membrane is not separated from the support in which case the support is preferably sufficiently porous to enable a high flux through the resultant membrane. Examples of porous support include woven materials, non-woven materials, porous polymeric membranes, porous inorganic membranes. The porous support is not limited to sheet form, also porous supports in tubular form like hollow fibers can be used. Removal of the solvent preferably is done before rerolling the support with the membrane thereon but may also be done at a later stage.

The membrane of the invention is preferably used in a module wherein the membrane is assembled into a cartridge. The membrane geometry influences the manner in which the membrane is packaged. The preferred membrane cartridge geometries are flatsheet, spiral-wound and hollow-fiber.

While we have emphasised the usefulness of the membranes of the present invention for separating gases it will be understood that the present invention is not limited to the process for making gas permeable membranes.

The present invention will be illustrated in more detail by the following non-limiting examples. Unless stated otherwise, all given ratios and amounts are based on weight.

EXAMPLES

A. Experiments for High Temperature Application

Preparation of the Membrane

A mixture was prepared as described below for each example

The mixture was coated on a glass plate by a bar coater (Spira) wound K Bar from R K Print Coat Instruments Ltd.) at 200 micrometer coating thickness, and cured by exposure to UV light using Light-Hammer™ fitted in a bench-top conveyor LC6E (both supplied by Fusion UV Systems) with 100% UV power (D-bulb) and a conveyer speed of 15 m/min The cured film (membrane) was removed from the glass plate and dried at 40° C. for 30 min.

Evaluation of the Physical Property of the Membrane

The physical strength (bendability) of the membrane was evaluated by bending the obtained free film around a plastic plate of 3 mm thickness and ranked A-E according the result of the test.

A: 180° bendable without breaking,

B: breaks between 120° and 180°,

C: breaks between 90° and 120°,

D: breaks between 60° and 90°,

E: breaks at <60°

Calculation of EO Content of the Membrane

The EO content of the membrane is calculated by determining the EO content of the non volatile components whereby the support is not included—in case the membrane is not separated from the support. The EO content of the crosslinkable compounds is given below. The EO content of Zonyl™ FSN100 was estimated as 60%. Additol™ HDMAP does not contain EO-groups. The EO content is calculated as follows: EO content={(wt % of each non-volatile compound)*(avg MW of oxyethylene fraction in each non-volatile compound)/(avg. MW of each non-volatile compound)}/{total solid content}, wherein the total solid content of the composition is formed by the non-volatile components.

Evaluation of the Gas Permeability

Flux of $CO_2$ and $N_2$ through the obtained film was measured at 80° C. and gas feed pressure of 2000 kPa (20 bar) using a gas permeation cell from Millipore with a measurement diameter of 4.2 cm for each gas separately. Permeability P was calculated based on the following equation:

$$P = F \times L \times 10^{-12}/(60 \times A \times p) \text{(unit: } m^3(STP) \cdot m/m^2 \cdot s \cdot kPa\text{)}$$

Where F is gas flow (SCCM), L is membrane thickness (micrometer), A is membrane area=0.001385 $m^2$, and p is feed gas pressure (kPa). STP is Standard Temperature and Pressure, which is 0° C. and 1 atm, thus 1 $m^3$ (STP) is 1 $m^3$ at STP condition, SCCM is "standard cc/min", which is the flow (cc/min) at STP condition.

The selectivity ($\alpha_{CO2/N2}$) was calculated based on following equation.

$$\alpha_{CO2/N2} = P_{CO2}/P_{N2}$$

Comparative example 1

50 parts of PEG600DA (Poly(ethylene glycol) diacrylate, average Mn=700 Da from Sigma Aldrich) was mixed with 0.09 parts of Zonyl™ FSN (from DuPont), 0.5 parts of Additol™ HDMAP (2-hydroxy-2-methyl-1-phenyl-1-propanone from Surface Specialities), and 49.4 parts of water.

The mixture was coated and cured according the procedure mentioned above, and evaluated.

The cured mixture before drying had a gel-like appearance and after drying the film could be removed from the glass plate but was very easy to brake (not bendable).

Thickness of the dried film was 150 micrometer.

The $CO_2$ flow through the film was 1.58 SCCM, and the $N_2$ flow was below detection limit of the flow meter (0.2 SCCM). Therefore the $CO_2$ permeability is:

$$(1.58 \times 150 \times 10^{-12})/(60 \times 0.001385 \times 2000) = 1.426 \times 10^{-12} \, m^3(STP) \cdot m/m^2 \cdot s \cdot kPa.$$

Since the $N_2$ flow is less than 0.2 SCCM, the $N_2$ permeability is less than $0.18 \, m^3(STP) \cdot m/m^2 \cdot s \cdot kPa$ ($=(0.2 \times 150 \times 10^{-12})/(60 \times 0.001385 \times 2000)$), therefore the $CO_2/N_2$ selectivity $\alpha_{CO2/N2} = P_{CO2}/P_{N2}$ is more than $1.426/0.18 = 7.9$.

Oxyethylene (EO) content of PEG600DA is 82.0%; the EO content of the polymer film was therefore 81.2%.

Comparative Example 2

50 parts of BPA-(EO)30-DMA (Bisphenol A ethoxylate dimethacrylate, average Mn=1700 Da, from Sigma Aldrich) was mixed with 0.09 parts of Zonyl™ FSN (from DuPont), 0.5 parts of Additol™ HDMAP (from Surface Specialities), and 49.4 parts of water.

The mixture was coated and cured according the same procedure as in comparative example 1. The cured mixture was still wet and had not become gel-like; after drying it was a very viscous liquid which couldn't be removed as film. Thus no further evaluation on physical property and gas permeability could be done.

Example 1

50 parts of CD9038 (Ethoxylated (30) Bisphenol A diacrylate, Mn=1656 Da from Sartomer) was mixed with 0.09 parts of Zonyl™ FSN (from DuPont), 0.5 parts of Additol™ HDMAP (from Surface Specialities), and 49.4 parts of water.

The mixture was coated and cured according the same procedure as in comparative example 1. The cured mixture before drying had a gel-like appearance. After drying the film could be removed from the glass plate and was bendable to some extent) (>120°). Thickness of the dried film was 150 micrometer.

The $CO_2$ flow through the film was 2.66 SCCM, and the $N_2$ flow was below detection limit of the flow meter (0.2 SCCM). Therefore the $CO_2$ permeability is:

$$(2.66 \times 150 \times 10^{-12})/(60 \times 0.001385 \times 2000) = 2.39 \times 10^{-12} \, m^3(STP) \cdot m/m^2 \cdot s \cdot kPa.$$

Since the $N_2$ flow is less than 0.2 SCCM, the $N_2$ permeability is less than $0.18 \, m^3(STP) \cdot m/m^2 \cdot s \cdot kPa$ ($=(0.2 \times 150 \times 10^{-12})/(60 \times 0.001385 \times 2000)$), therefore the $CO_2/N_2$ selectivity $\alpha_{CO2/N2} = P_{CO2}/P_{N2}$ is more than $2.39/0.18 = 13.2$.

Oxyethylene (EO) content of CD9038 is 79.7%; the EO content of the polymer film was therefore 78.9%.

Example 2

Example 2 was repeated according the same procedure as in Example 1, except that PRO4252 (Poly(ethylene glycol) 1450 diacrylate (Mn=1578 Da) from Sartomer), was used instead of CD9038. The cured mixture before drying had a gel-like appearance and after drying the film could be removed from the glass plate. The result is shown in Table 1.

Oxyethylene (EO) content of PRO4252 is 92.0%; the EO content of the polymer film was therefore 91.0%.

Example 3

Example 3 was repeated according the same procedure as in Example 1, except that PEG2000DA (Poly(ethylene glycol) 2000 diacrylate (Mn=2126 Da) from Monomer-Polymer & Dajac Laboratories, Inc.) was used instead of CD9038. The cured mixture before drying had a gel-like appearance and after drying the film could be removed from the glass plate. The result is shown in Table 1.

Oxyethylene (EO) content of PEG2000DA is 94.1%; the EO content of the polymer film was therefore 93.1%.

Example 4

Example 4 was repeated according the same procedure as in Example 1, except that PEG4000DA (Poly(ethylene glycol) 4000 diacrylate (Mn=4126 Da) from Monomer-Polymer & Dajac Laboratories, Inc.) was used instead of CD9038. The cured mixture before drying had a gel-like appearance and after drying the film could be removed from the glass plate. The result is shown in Table 1.

Oxyethylene (EO) content of PEG4000DA is 96.9%, the EO content of the polymer film was therefore 95.9%.

TABLE 1

| | Polymerizable compound | Vinyl group | n | Mn (Da) | EO content | Bendability | $CO_2$ permeability P | $\alpha_{CO2/N2}$ |
|---|---|---|---|---|---|---|---|---|
| Comparative Example 1 | PEG 600DA | acrylate | 13 | 700 | 81.2 | E | 1.425 | >7.9 |
| Comparative Example 2 | BPA-(EO)30-DMA | methacrylate | 30 | 1700 | — | — | — | — |
| Example 1 | CD9038 | acrylate | 30 | 1656 | 78.9 | C | 2.39 | >13 |
| Example 2 | PRO 4252 | acrylate | 33 | 1578 | 91.0 | B | 3.17 | >18 |
| Example 3 | PEG 2000DA | acrylate | 45 | 2126 | 93.1 | B | 3.65 | >21 |
| Example 4 | PEG 4000DA | acrylate | 91 | 4126 | 95.9 | A | 4.70 | >26 | n: number of oxyethylene groups in the polymerizable compound.
Mn: molecular weight of the polymerizable compound.
Unit of permeability P: $\times 10^{-12} \, m^3 (STP) \cdot m/m^2 \cdot s \cdot kPa$ The water permeance at 20° C. of the membranes of table 1 (except comparative example 2) was found to be lower than $1.4 \times 10^{-9}$ m$^3$/m$^2$·s·kPa.

Results

The polymerization of all examples with acrylate groups by curing with UV light went OK. The example with methacrylate groups gave insufficient curing, the film could not be separated from the support.

Observation of the membrane surface and cross section by SEM (scanning electron microscope) showed that no pores were visible indicating that the pore sizes—if present—are smaller than 10 nm The physical strength (bendability) of the membrane was best with the polymerizable compound having the largest number of oxyethylene units.

Using polymerizable compounds with a large number of oxyethylene units resulted in high permeance values.

Due to the very low nitrogen flow below the detection limit of the flow meter used (down to 0.2 SCCM), only a minimum value for the selectivity could be confirmed.

The EO content of the polymer film was 85.6%.

Comparative Example 4

Comparative Example 4 was repeated according the same procedure as in Comparative Example 3, except that CN435 (Ethoxylated (15) trimethylolpropane triacrylate, from Sartomer) was used instead of PEG600DA. The obtained film was very easy to brake so gas permeation properties could not be measured. The result is shown in Table 2.

Oxyethylene (EO) content of CN435 is 69%; the EO content of the polymer film was therefore 74.3%.

Example 7

Example 7 was repeated according the same procedure as in Comparative Example 3, except that AT-30E (Ethoxylated (30) trimethylolpropane triacrylate, from Shin-Nakamura Chemicals) was used instead of PEG600DA. The result is shown in Table 2.

Oxyethylene (E(1) content of AT-30E is 81.7%; the EO content of the polymer film was therefore 80.6%.

TABLE 2

| | Polymerizable compound | f | n | Mn (Da) | curing | EO content | Bendability | CO$_2$ permeance P | $\alpha_{CO2/N2}$ |
|---|---|---|---|---|---|---|---|---|---|
| Comparative Example 3 | PEG 600DA | 2 | 13 | 700 | OK | 80.7 | D | 3.05 | >17 |
| Example 5 | CD9038 | 2 | 30 | 1656 | OK | 79.6 | B | 4.20 | >24 |
| Example 6 | PRO 4252 | 2 | 33 | 1578 | OK | 85.6 | B | 4.81 | >27 |
| Comparative Example 4 | CN435 | 3 | 15 | 956 | OK broken | 74.3 | E | — | — |
| Example 7 | AT-30E | 3 | 30 | 1616 | OK | 80.6 | C | 3.82 | >22 | f: functionality of the polymerizable compound (number of unsaturated groups in the polymerizable compound)
n: number of oxyethylene groups in the polymerizable compound.
Mn: molecular weight of the polymerizable compound.
Unit of permeance P: × 10$^{-12}$ m$^3$ (STP) · m/m$^2$ · s · kPa B. Experiments with Mixtures of Polymerizable Compound with MPEG-A (poly(ethylene glycol) methyl ether acrylate)

Comparative Example 3

Comparative Example 3 was repeated according the same procedure as in Example 1, except that 25 parts of PEG600DA and 25 parts MPEG-A (Poly(ethylene glycol) methyl ether acrylate, Mn ~454 Da, from Sigma Aldrich) were used instead of 50 parts of PEG600DA. The result is shown in Table 2.

Oxyethylene (EO) content of MPEG-A is 81.1%; the EO content of the polymer film was therefore 80.7%.

Example 5

Example 5 was repeated according the same procedure as in Comparative Example 3, except that CD9038 was used instead of PEG600DA. The result is shown in Table 2.

The EO content of the polymer film was 79.6%.

Example 6

Example 6 was repeated according the same procedure as in Comparative Example 3, except that PRO4252 was used instead of PEG600DA. The result is shown in Table 2.

The water permeance at 20° C. of the membranes of table 2 was found to be lower than $1.4 \times 10^{-9}$ m$^3$/m$^2$·s·kPa.

Results

The results obtained with mixtures of polymerizable compounds and monofunctional monomers are in agreement with the results described above in section A with polymerizable compounds only except that with the mixtures higher permeability values are obtained. This result can be explained by a lower cross-linking density because the monofunctional monomers are cured into the matrix but do not contribute to the crosslinking density.

C. Experiments for Low Temperature Applications

Evaluation of Gas Permeability

Flux of CO$_2$ and N$_2$ through the obtained film was determined as described above except that the measurement was carried out at room temperature (23° C.) and gas feed pressure of 2000 kPa (20 bar).

Comparative Example 5

50 parts of PEG600DA (Poly(ethylene glycol) diacrylate, average Mn=700 Da from Sigma Aldrich) was mixed with 0.09 parts of Zonyl™ FSN (from DuPont), 0.5 parts of Additol™ HDMAP (from Surface Specialities), and 49.4 parts of water.

The mixture was coated and cured according the procedure mentioned above, and evaluated.

The cured mixture before drying had a gel-like appearance and after drying the film could be removed from the glass plate but was very easy to brake (not bendable).

Thickness of the dried film was 150 micrometer.

The $CO_2$ flow through the film was 0.94 SCCM, and the $N_2$ flow was below the detection limit of the flow meter (0.2 SCCM). Therefore the $CO_2$ permeability is: $(0.94 \times 150 \times 10^{-12})/(60 \times 0.001385 \times 2000) = 0.85 \times 10^{-12}$ $m^3(STP) \cdot m/m^2 \cdot s \cdot kPa$.

Since the $N_2$ flow is less than 0.2 SCCM, the $N_2$ permeability is less than 0.18 $m^3(STP) \cdot m/m^2 \cdot s \cdot kPa$ $(=(0.2 \times 150 \times 10^{-12})/(60 \times 0.001385 \times 2000))$, therefore the $CO_2/N_2$ selectivity $\alpha_{CO2/N2} = P_{CO2}/P_{N2}$ is more than $0.85/0.18 = 4.7$.

Comparative Example 6

50 parts of BPA-(EO)30-DMA (Bisphenol A ethoxylate dimethacrylate, average Mn=1700 Da, from Sigma Aldrich) was mixed with 0.09 parts of Zonyl™ FSN (from DuPont), 0.5 parts of Additol™ HDMAP (from Surface Specialities), and 49.4 parts of water.

The mixture was coated and cured according the same procedure as in comparative example 1. The cured mixture was still wet and had not become gel-like; after drying it was a very viscous liquid which couldn't be removed as film. Thus no further evaluation on physical property and gas permeability could be done.

Example 8

50 parts of CD9038 (Ethoxylated (30) Bisphenol A diacrylate, Mn=1656 Da from Sartomer) was mixed with 0.09 parts of Zonyl™ FSN (from DuPont), 0.5 parts of Additol™ HDMAP (from Surface Specialities), and 49.4 parts of water.

The mixture was coated and cured according the same procedure as in comparative example 1. The cured mixture before drying had a gel-like appearance. After drying the film could be removed from the glass plate and was bendable to some extent) (>120°). Thickness of the dried film was 150 micrometer.

The $CO_2$ flow through the film was 1.25 SCCM, and the $N_2$ flow was below the detection limit of the flow meter (0.2 SCCM). Therefore the $CO_2$ permeability is:

$(1.25 \times 150 \times 10^{-12})/(60 \times 0.001385 \times 2000) = 1.13 \times 10^{-12}$ $m^3(STP) \cdot m/m^2 \cdot s \cdot kPa$.

Since the $N_2$ flow is less than 0.2 SCCM, the $N_2$ permeability is less than 0.18 $m^3(STP) \cdot m/m^2 \cdot s \cdot kPa$ $(=(0.2 \times 150 \times 10^{-12})/(60 \times 0.001385 \times 2000))$, therefore the $CO_2/N_2$ selectivity $\alpha_{CO2/N2} = P_{CO2}/P_{N2}$ is more than $1.13/0.18 = 6.3$.

Example 9

Example 2 was carried out according the same procedure as in Example 8, except that PRO4252 (Poly(ethylene glycol) 1450 diacrylate (Mn=1570 Da) from Sartomer), was used instead of CD9038. The result is shown in Table 3.

Example 10

Example 10 was carried out according the same procedure as in Example 8, except that PEG2000DA (Poly(ethylene glycol) 2000 diacrylate (Mn=2130 Da) from Monomer-Polymer & Dajac Laboratories, Inc.) was used instead of CD9038. The result is shown in Table 3.

TABLE 3

| | Polymerizable compound | n | Mn (Da) | EO content | Bendability | $CO_2$ permeability P | $\alpha_{CO2/N2}$ |
|---|---|---|---|---|---|---|---|
| Comparative Example 5 | PEG 600DA | 14 | 742 | 81.2 | E | 0.85 | >4.7 |
| Comparative Example 6 | BPA-(EO)30-DMA | 30 | 1600 | — | — | — | — |
| Example 8 | CD9038 | 30 | 1572 | 78.9 | C | 1.13 | >6.3 |
| Example 9 | PRO 4252 | 33 | 1578 | 91.0 | B | 1.69 | >10 |
| Example 10 | PEG 2000DA | 45 | 2126 | 93.1 | B | 0.46 | >3 | n: number of oxyethylene groups in the polymerizable compound.
Mn: molecular weight of the polymerizable compound.
Unit of permeability P: $\times 10^{-12}$ $m^3(STP) \cdot m/m^2 \cdot s \cdot kPa$ The water permeance at 20° C. of the membranes of table 3 was found to be lower than $1.4 \times 10^{-9}/m^2 \cdot s \cdot kPa$.

Results

The absolute values of the permeabilities for the measurement at room temperature are lower than for those measured at 80° C. When the number of oxyethylene units is high (45 or larger) the permeability is strongly reduced indicating that for room temperature conditions an optimum value exists for the number of oxyethylene units. In this experiment the best results are obtained with a number of 33 oxyethylene units. Thus at room temperature there is a preference for the number of oxyethylene units which preferably does not exceed 44 units.

D Experiments with Mixtures of Polymerizable Compounds with MPEG-A (poly(ethylene glycol) methyl ether acrylate)

Comparative Example 7

Comparative Example 7 was carried out according the same procedure as in Comparative Example 5, except that 25 parts of PEG600DA and 25 parts MPEG-A (Poly(ethylene glycol) methyl ether acrylate Mn ~454 Da, from Sigma Aldrich) were used instead of 50 parts of PEG600DA. The result is shown in Table 4.

Example 11

Example 11 was carried out according the same procedure as in Comparative Example 7, except that CD9038 was used instead of PEG600DA. The result is shown in Table 4.

Example 12

Example 12 was carried out according the same procedure as in Comparative Example 7, except that PRO4252 was used instead of PEG600DA. The result is shown in Table 4.

Example 13

Example 13 was carried out according the same procedure as in Comparative Example 7, except that PEG2000DA was used instead of PEG600DA. The result is shown in Table 4.

Comparative Example 8

Comparative Example 8 was carried out according the same procedure as in Comparative Example 7, except that CN435 (Ethoxylated (15) trimethylolpropane triacrylate, from Sartomer) was used instead of PEG600DA. The obtained film was very easy to brake so gas permeation properties could not be measured. The result is shown in Table 4.

Example 14

Example 14 was carried out according the same procedure as in Comparative Example 7, except that AT-30E (Ethoxylated (30) trimethylolpropane triacrylate, from Shin-Nakamura Chemicals) was used instead of PEG600DA. The result is shown in Table 4.

TABLE 4

|  | Polymerizable compound | f | n | Mn | curing | EO content | Bendability | $CO_2$ permeability P | $\alpha_{CO2/N2}$ |
|---|---|---|---|---|---|---|---|---|---|
| Comparative Example 7 | PEG 600DA | 2 | 13 | 742 | OK | 80.7 | D | 1.63 | >9 |
| Example 11 | CD 9038 | 2 | 30 | 1572 | OK | 79.6 | B | 2.05 | >11 |
| Example 12 | PRO 4252 | 2 | 33 | 1578 | OK | 85.6 | B | 2.9 | >16 |
| Example 13 | PEG 2000DA | 2 | 45 | 2126 | OK | 86.7 | A | 0.75 | >4 |
| Comparative Example 8 | CN435 | 3 | 15 | 952 | OK broken | 74.3 | E | — | — |
| Example 14 | AT-30E | 3 | 30 | 1612 | OK | 80.6 | B | 2.75 | >15 | f: functionality of the polymerizable compound (number of unsaturated groups in the polymerizable compound)
n: number of oxyethylene groups in the polymerizable compound.
Mn: molecular weight of the polymerizable compound.
Unit of permeability P: $\times 10^{-12}$ $m^3$ (STP)·m/$m^2$·s·kPa The water permeance at 20° C. of the membranes of table 4 was found to be lower than $1.4 \times 10^{-9}$ $m^3/m^2$·s·kPa.

Results

In agreement with the results in section C the absolute values for the permeabilities are lower than at 80° C. Also in these experiments the permeability is relatively low for polymerizable compounds with a high number of oxyethylene units. Also for mixtures with monofunctional monomers the best result in this experiment was obtained with a number of 33 oxyethylene units.

E Examples of Composite Membranes

Example 15

A curable composition was made by mixing 8 parts of CD9038 (Ethoxylated (30) Bisphenol A diacrylate, Mn=1656 Da from Sartomer) and 2 parts of Aquacalk TWB (a chemically crosslinked poly(oxyalkylene) from Sumitomo Seika), with 0.3 parts of Zonyl™ FSN100 (from DuPont), 0.5 parts of Additol™ HDMAP (from Cytec Surface Specialities), 6 parts of isopropanol and 83.2 parts of water. A polyacrylonitrile membrane GMT-L-6 from GMT Membrantechnik GmbH, Germany was used as porous support. A composite membrane was formed by a simultaneous multilayer process. In this process an inert liquid and the curable composition were applied continuously to the porous membrane using a slide bead coater using 2 slots, an irradiation source and a composite membrane collecting station. The porous support moved at a speed of 30 m/min from the slide bead coater to the irradiation source and then on to the drying station. Water was used as inert liquid. The water was applied as lower layer (lower slot) with 100 micron thickness, and the curable composition was applied as upper layer (higher slot) with 15 micron thickness. The temperature of both the inert liquid as the curable composition was 35° C. The coated membrane passed under UV curing device Light Hammer LH6 from Fusion UV Systems, applying 100% intensity of the installed UV-lamp (D-bulb), then the line proceeded further to the drying zone with a temperature of 40° C. and 8% relative humidity.

The $CO_2$ flow through the film was determined at 23° C. and at 2000 kPa giving a value of 73.8 SCCM, corresponding with a $CO_2$ permeance of $4.44 \times 10^{-7}$ $m^3$(STP)/$m^2$·s·kPa. The $N_2$ flow at 23° C. and at 2000 kPa was 1.2 SCCM, corresponding with a $N_2$ permeance of $7.20 \times 10^{-9}$ $m^3$(STP)/$m^2$·s·kPa. The resultant composite membrane had a good $CO_2$ selectivity ($\alpha CO2/N2=62$).

SEM analysis confirmed that a non-porous layer of 0.925 micron thickness had formed on the porous support.

The Oxyethylene (EO) content of Aquacalk TWB was estimated as 95%; the EO content of the non-porous layer was 78.3 wt %.

The water permeance at 20° C. of the membrane was found to be $1.1 \times 10^{-8}$ $m^3/m^2$·s·kPa.

Example 16

A composite membrane was prepared by a consecutive multilayer process using the curable composition and the support of Example 15. As a first step the polyacrylonitrile membrane passed through a bath filled with water as inert liquid and excessive liquid droplets on the surfaces were removed by air knife. The saturated membrane was then coated with the curable composition by a slide bead coater (using one slot) with 15 micron thickness at a speed of 30 m/min. Subsequent curing and drying steps were as described in Example 8 above.

The $CO_2$ flow through the film at 23° C. and at 2000 kPa was 71.9 SCCM, corresponding with a $CO_2$ permeance of $5.39 \times 10^{-7}$ $m^3$(STP)·m/$m^2$·s·kPa. The $N_2$ flow at 23° C. and at 2000 kPa was 1.07 SCCM, corresponding with a $N_2$ permeance of $8.03 \times 10^{-9}$ m³(STP)/m²·s·kPa. The resultant composite membrane gave good $CO_2$ selectivity (aCO2/N2=67).

SEM analysis confirmed that a non-porous layer of 1.2 micron thickness had formed on the porous support.

Oxyethylene content of the non-porous layer was 78.3 wt %.

The invention claimed is:

1. A process for preparing a membrane comprising the steps of:
   (i) providing a composition comprising a polymerizable compound having at least two non-substituted vinyl groups and at least 25 oxyethylene groups forming an uninterrupted chain of formula —$(CH_2CH_2O)_n$— wherein n is at least 25;
   (ii) applying said composition to a support thereby forming a continuous layer on the support;
   (iii) polymerizing said composition thereby forming a non-porous polymer film;
   (iv) optionally separating the polymer film from the support;
   (v) optionally washing and/or drying the polymer film.

2. A process according to claim 1 wherein the polymerizable compound has at least 25 but not more than 44 oxyethylene groups.

3. A process according to claim 1 wherein at least one of said vinyl groups is an acrylate group.

4. A process according to claim 1 wherein the composition comprises the following components:
   (i) 3 to 80 weight % in total of said polymerizable compound;
   (ii) 0 to 75 weight % in total of compounds having one (and only one) ethylenically unsaturated group;
   (iii) 0 to 10 weight % in total of other additives;
   wherein the balance to 100 weight % is a liquid medium.

5. A process according to claim 1 wherein the support is porous.

6. A process according to claim 1 wherein the polymerization is effected by exposing the composition to ultra violet radiation using one or more ultra violet lamps irradiating the composition.

7. A process according to claim 1 wherein the membrane is produced at a rate of at least 15 m/min.

8. A process according to claim 1 wherein said polymerizable compound comprises at least 70 weight % of oxyethylene groups.

9. A process according to claim 1 wherein said non-porous polymer film comprises at least 60 weight % of oxyethylene groups.

10. A process according to claim 1 comprising the steps of separating the polymer film from the support and washing and/or drying the polymer film.

11. A process according to claim 1 wherein the polymerizable compound has two non-substituted vinyl groups, at least one of said non-substituted vinyl groups is an acrylate group, the polymerization is effected by exposing the composition to ultra violet radiation using one or more ultra violet lamps irradiating the composition and the membrane is produced at a rate of at least 15 m/min.

12. A process according to claim 1 wherein pure water permeance of the membrane at 20° C. is less than $6 \cdot 10^{-8}$ m³/m²·s·kPa.

13. A process according to claim 12 wherein the composition comprises the following components:
   (i) 3 to 80 weight % in total of said polymerizable compound;
   (ii) 0 to 75 weight % in total of compounds having one (and only one) ethylenically unsaturated group;
   (iii) 0 to 10 weight % in total of other additives;
   wherein the balance to 100 weight % is a liquid medium.

14. A process according to claim 12 wherein said polymerizable compound comprises at least 70 weight % of oxyethylene groups.

15. A membrane obtained by a process comprising the steps of:
   (i) providing a composition comprising a polymerizable compound having at least two non-substituted vinyl groups and at least 25 oxyethylene groups forming an uninterrupted chain of formula —$(CH_2CH_2O)_n$— wherein n is at least 25;
   (ii) applying said composition to a support thereby forming a continuous layer on the support;
   (iii) polymerizing said composition thereby forming a non-porous polymer film;
   (iv) optionally separating the polymer film from the support; and
   (v) optionally washing and/or drying the polymer film.

16. A membrane according to claim 15 for the separation of gases and/or vapors.

17. A membrane according to claim 15 wherein the content of oxyethylene groups in the membrane is at least 75 wt %.

18. A membrane obtained by a process comprising the steps of:
   (i) providing a composition;
   (ii) applying said composition to a support thereby forming a continuous layer on the support;
   (iii) polymerizing said composition thereby forming a non-porous polymer film;
   (iv) optionally separating the polymer film from the support; and
   (v) optionally washing and/or drying the polymer film;
   wherein the polymerization is effected by exposing the composition to ultra violet radiation using one or more ultra violet lamps irradiating the composition and the membrane is produced at a rate of at least 15 m/min, and
   wherein the curable composition comprises:
   (i) 3 to 80 weight % in total of a polymerizable compound having at least two non-substituted vinyl groups, at least one of which non-substituted vinyl groups is an acrylate group, and at least 25 oxyethylene groups forming an uninterrupted chain of formula —$(CH_2CH_2O)_n$— wherein n is at least 25;
   (ii) 0 to 75 weight % in total of compounds having one (and only one) ethylenically unsaturated group;
   (iii) 0 to 10 weight % in total of other additives;
   wherein the balance to 100 weight % is a liquid medium.

19. A membrane according to claim 18 wherein pure water permeance of the membrane at 20° C. is less than $6 \cdot 10^{-8}$ m³/m²·s·kPa.

20. A module comprising at least one cartridge and at least one membrane according to claim 19.

21. A membrane according to claim 18 for the separation of gases and/or vapors.

* * * * *